US010655720B2

(12) United States Patent
Hillman et al.

(10) Patent No.: US 10,655,720 B2
(45) Date of Patent: May 19, 2020

(54) ELECTRONIC LIMITED SLIP DIFFERENTIAL

(71) Applicant: Eaton Corporation, Cleveland, OH (US)

(72) Inventors: Chad Hillman, Ceresco, MI (US); Jordan Allen, Marshall, MI (US); Mark James Shewchuk, Charlotte, MI (US)

(73) Assignee: EatON Corporation, Cleveland, OH (US)

( * ) Notice: Subject to any disclaimer, the term of this patent is extended or adjusted under 35 U.S.C. 154(b) by 227 days.

(21) Appl. No.: 15/817,803

(22) Filed: Nov. 20, 2017

(65) Prior Publication Data
US 2018/0073617 A1 Mar. 15, 2018

Related U.S. Application Data

(63) Continuation of application No. PCT/US2016/033552, filed on May 20, 2016.

(60) Provisional application No. 62/164,463, filed on May 20, 2015.

(51) Int. Cl.
*F16H 48/32* (2012.01)
*F16H 57/037* (2012.01)
*F16H 48/08* (2006.01)
*F16H 48/22* (2006.01)
*F16H 57/02* (2012.01)
*F16D 13/52* (2006.01)
*F16D 25/08* (2006.01)
*F16H 48/40* (2012.01)

(52) U.S. Cl.
CPC .............. *F16H 48/32* (2013.01); *F16D 13/52* (2013.01); *F16D 25/083* (2013.01); *F16H 48/08* (2013.01); *F16H 48/22* (2013.01); *F16H 48/40* (2013.01); *F16H 57/02* (2013.01); *F16H 57/037* (2013.01)

(58) Field of Classification Search
CPC .......... F16H 48/32; F16H 48/40; F16H 48/22; F16H 48/08; F16H 57/02; F16H 57/037; F16D 25/083; F16D 13/52
See application file for complete search history.

(56) References Cited

U.S. PATENT DOCUMENTS

| 2005/0167223 A1 | 8/2005 | Puiu |
| 2005/0167228 A1 | 8/2005 | Baxter |
| 2006/0169564 A1 | 8/2006 | Krisher et al. |

(Continued)

FOREIGN PATENT DOCUMENTS

KR 20040052045 A 6/2004

OTHER PUBLICATIONS

International Search Report and Written Opinion for International Application No. PCT/US2016/033552 dated Sep. 2, 2016, 12 pages.

*Primary Examiner* — Jacob S. Scott
*Assistant Examiner* — Lillian T Nguyen
(74) *Attorney, Agent, or Firm* — RMCK Law Group PLC

(57) ABSTRACT

An electronic limited slip differential system constructed in accordance to one example of the present disclosure is provided. The system includes an axle housing defining an inner chamber, a differential assembly disposed within the inner chamber, and a hydraulic control unit (HCU) coupled directly to a top of the axle housing such that the HCU is mounted on a top of the differential assembly.

16 Claims, 5 Drawing Sheets

(56) References Cited

U.S. PATENT DOCUMENTS

| | | | | |
|---|---|---|---|---|
| 2006/0283319 A1* | 12/2006 | Garlick | ................... | F16H 48/08 |
| | | | | 91/499 |
| 2010/0218746 A1* | 9/2010 | Rabhi | ................... | F16K 11/161 |
| | | | | 123/48 B |
| 2010/0252348 A1* | 10/2010 | Ueda | ...................... | B60K 23/04 |
| | | | | 180/244 |
| 2014/0179484 A1* | 6/2014 | Fox | ......................... | F16H 48/32 |
| | | | | 475/231 |
| 2015/0111679 A1 | 4/2015 | Edler | | |

* cited by examiner

ELECTRONIC LIMITED SLIP DIFFERENTIAL

CROSS-REFERENCE TO RELATED APPLICATIONS

This application is a continuation of International Application No. PCT/US2016/033552 filed May 20, 2016, which claims the benefit of U.S. patent application No. 62/164,463 filed on May 20, 2015, the contents of which are incorporated herein by reference.

FIELD

The present disclosure relates generally to differential gear assemblies and more particularly to a hydraulic control unit coupled directly to a differential gear case arrangement having a clutch and a piston actuator.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electronic limited slip differential system constructed in accordance to one example of the present disclosure is provided. The system includes an axle housing defining an inner chamber, a differential assembly disposed within the inner chamber, and a hydraulic control unit (HCU) coupled directly to a top of the axle housing such that the HCU is mounted on a top of the differential assembly.

In addition to the foregoing, the described system may include one or more of the following features: wherein the top of the axle housing defines a mounting pad configured to receive a housing mounting structure of the HCU; wherein the mounting pad is an uppermost surface of the axle housing; wherein the HCU includes a housing having an accumulator portion, a housing manifold portion, and a motor portion; wherein the housing manifold portion includes a plurality of receiving bores configured to align with a plurality of mounting bores defined in the mounting pad, and a plurality of fasteners extend through the aligned receiving bores and mounting bores to couple the housing manifold portion to the mounting pad; wherein the receiving bores extend from a top of the housing manifold portion to a bottom of the housing manifold portion; wherein the HCU is only coupled to the axle housing at the location between the mounting pad and the housing manifold portion; and wherein the plurality of receiving bores comprises only four receiving bores, and the plurality of mounting bores comprises only four mounting bores; wherein the HCU includes a hydraulic nozzle extending downwardly from the housing manifold portion, and the mounting pad includes a hydraulic receiving bore located inward of the plurality of mounting bores and configured to receive the hydraulic nozzle therethrough.

In addition to the foregoing, the described system may include one or more of the following features: wherein the differential assembly comprises a differential case defining first and second output shaft openings that are co-axially aligned along an axis of rotation of the differential case, a first and a second side gear rotatably mounted within the differential case, the first and second side gears being co-axially aligned along the axis of rotation of the differential case, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening, a pair of pinion gears mounted between the first and second side gears, both of the pinion gears being rotatably mounted on a cross shaft that is fixed for rotation with the differential case, a clutch pack including a plurality of annular plates interleaved between a plurality of annular friction disks, the clutch pack arranged on a first side of the cross shaft, and an actuator assembly comprising a piston received in a piston housing, the actuator assembly configured to actuate the clutch pack, the actuator assembly arranged on a second side of the cross shaft, opposite the first side, the actuator assembly including a hydraulic port configured to receive the hydraulic nozzle.

In addition to the foregoing, the described system may include one or more of the following features: a pinion at least partially disposed within the differential case such that a clearance is defined between an end face of the pinion and an outer surface of the differential case; wherein a second clearance is defined between a top of the HCU and a bottom of a vehicle floor; wherein the second clearance is between approximately 22 mm and approximately 30 mm; a plurality of transfer rods that couple the clutch pack and the actuator assembly; wherein the actuator assembly further comprises a retainer and a first needle roller disposed on one side of the piston housing and a second needle roller disposed on an opposite side of the piston housing, and wherein the piston further comprises at least one O-ring mounted thereon, the at least one O-ring configured to slidably traverse along the piston housing; and wherein the hydraulic port extends from an outer circumference of the actuator assembly.

A vehicle constructed in accordance to one example of the present disclosure is provided. The vehicle includes a frame having a front and a rear, a vehicle floor, and an electronic limited slip differential system. The electronic limited slip differential system includes an axle housing defining an inner chamber, a differential assembly disposed within the inner chamber, and a hydraulic control unit (HCU) coupled directly to a top of the axle housing such that the HCU is mounted on a top of the differential assembly.

In addition to the foregoing, the described system may include one or more of the following features: wherein the top of the axle housing defines a mounting pad configured to receive a housing mounting structure of the HCU; wherein a clearance is defined between a top of the HCU and a bottom of the floor pan; and wherein the clearance is between approximately 22 mm and approximately 30 mm.

BRIEF DESCRIPTION OF THE DRAWINGS

The present disclosure will become more fully understood from the detailed description and the accompanying drawings, wherein.

DETAILED DESCRIPTION

Figure 1:
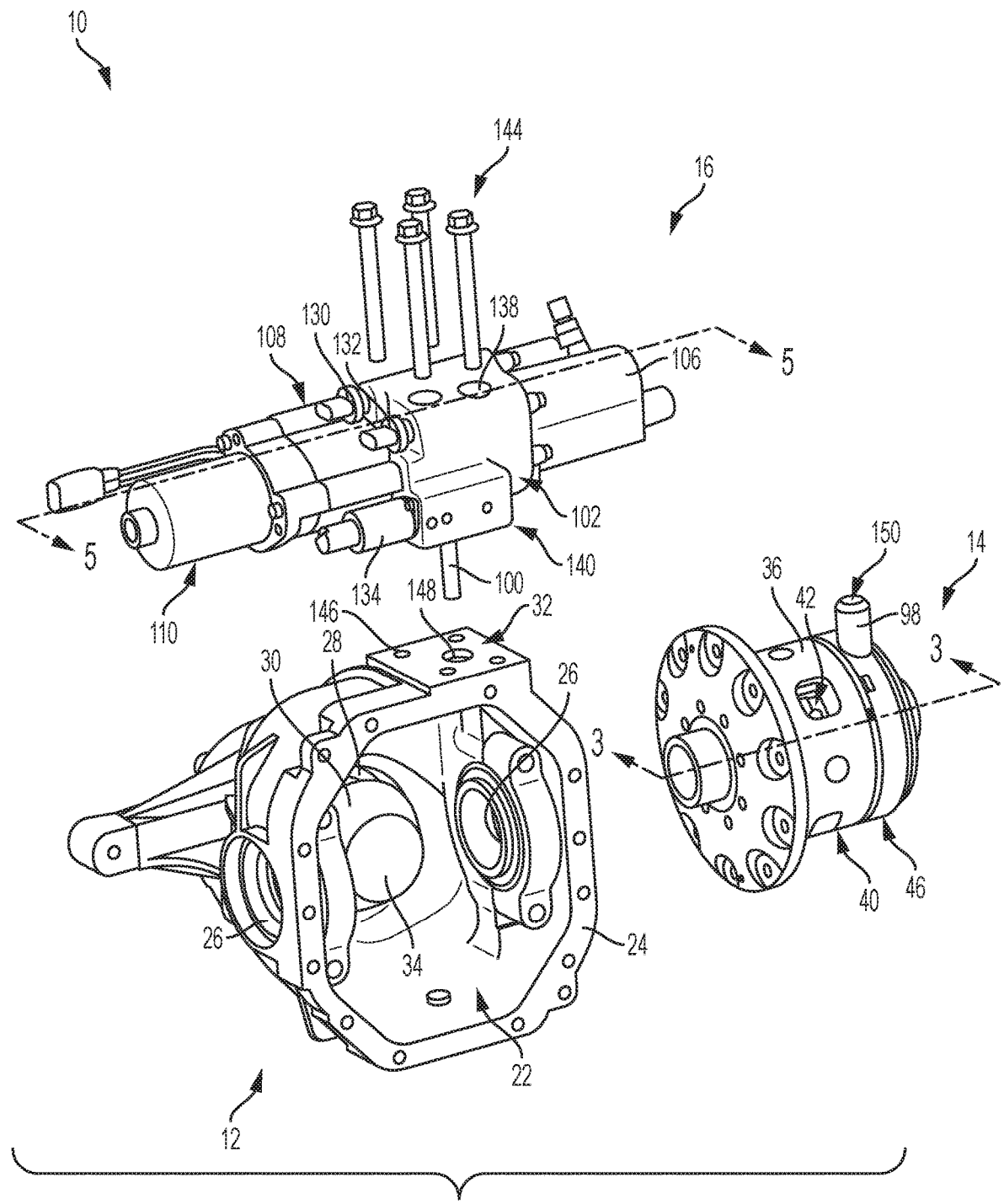
FIG. 1 is a perspective view of an electronic limited slip differential system before assembly constructed in accordance to one example of the present disclosure.
Figure 2:
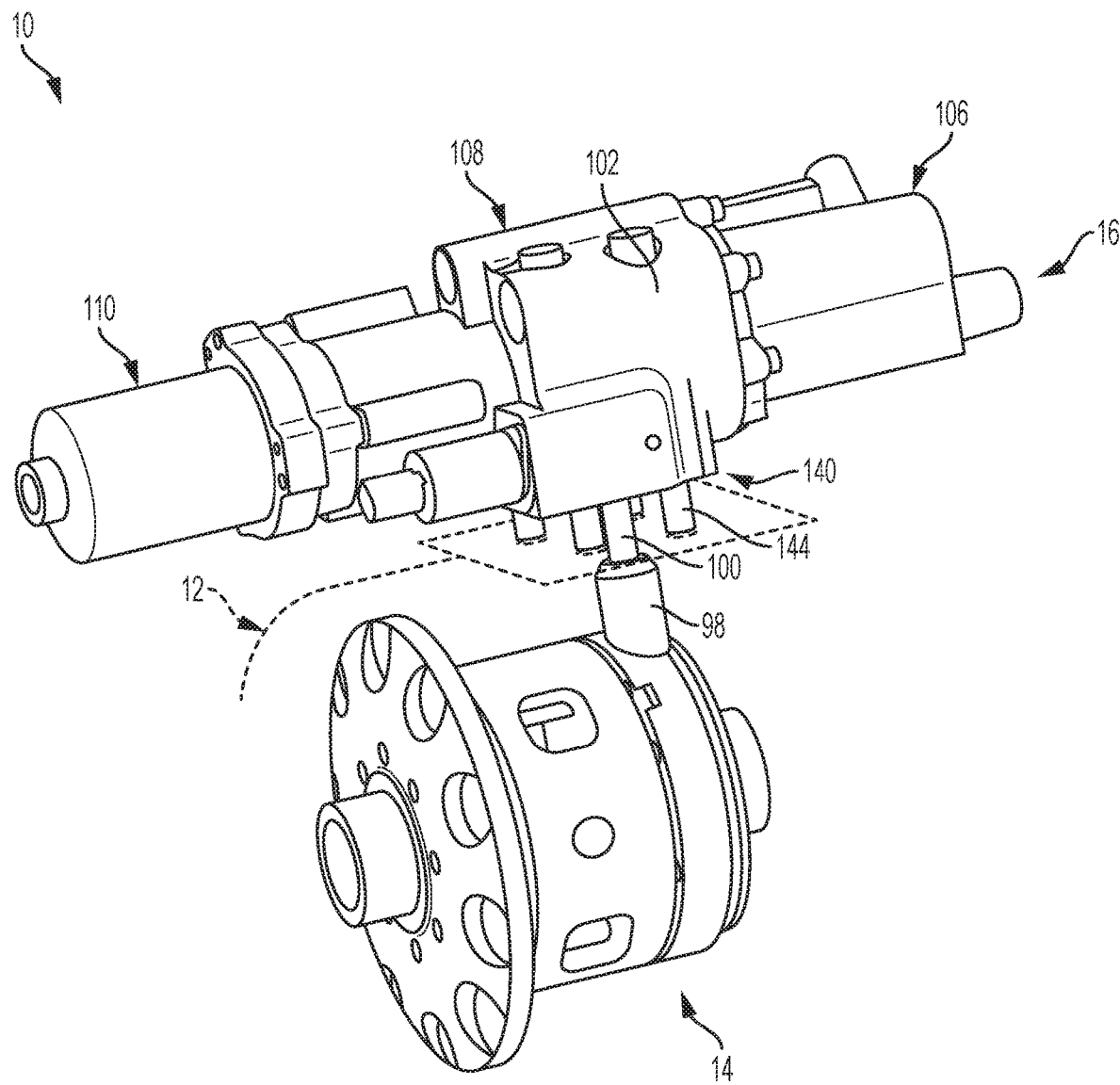
FIG. 2 is a perspective view of the differential gear system shown in FIG. 1 after assembly.

With initial reference to FIGS. 1 and 2, an electronic limited slip differential system constructed in accordance to the present disclosure is shown and generally identified at reference 10. The electronic limited slip differential system 10 can generally include an axle housing 12, an electronic limited slip differential assembly 14, and a hydraulic control unit (HCU) 16. The axle housing 12 is secured to a vehicle (not shown) and houses the electronic limited slip differential assembly 14. As shown in FIG. 2, the HCU 16 is directly coupled to the electronic limited slip differential assembly 14 at a single location by direct mounting to the axle housing 12, thereby providing a self-contained, non-remotely mounted differential system 10. This provides an improved, compact differential system that accommodates compact vehicle systems.

The axle housing 12 generally defines a cavity 22 configured to receive the differential assembly 14 therein. An end surface 24 is configured to couple to a carrier cover (not shown) to enclose the differential assembly 14 within the axle housing 12. A pair of openings 26 are configured to each receive an axle shaft (not shown), and an opening 28 is configured to receive a pinion 30 (FIG. 1) operably coupled to a driveshaft of the vehicle (not shown). The housing 12 can define a mounting surface or pad 32 configured to receive HCU 16, as described herein in more detail. As such, the mounting pad 32 can facilitate quick and proper alignment between the HCU 16 and the differential assembly 14, thereby reducing installation time and effort. Moreover, in the illustrated example, the mounting pad 32 is an uppermost surface of the axle housing 12, which enables the HCU 16 to be mounted on top of both the axle housing 12 and the differential assembly 14, which can provide increased protection of the HCU as well as improved packaging for vehicles limited by packaging space.

Figure 3:
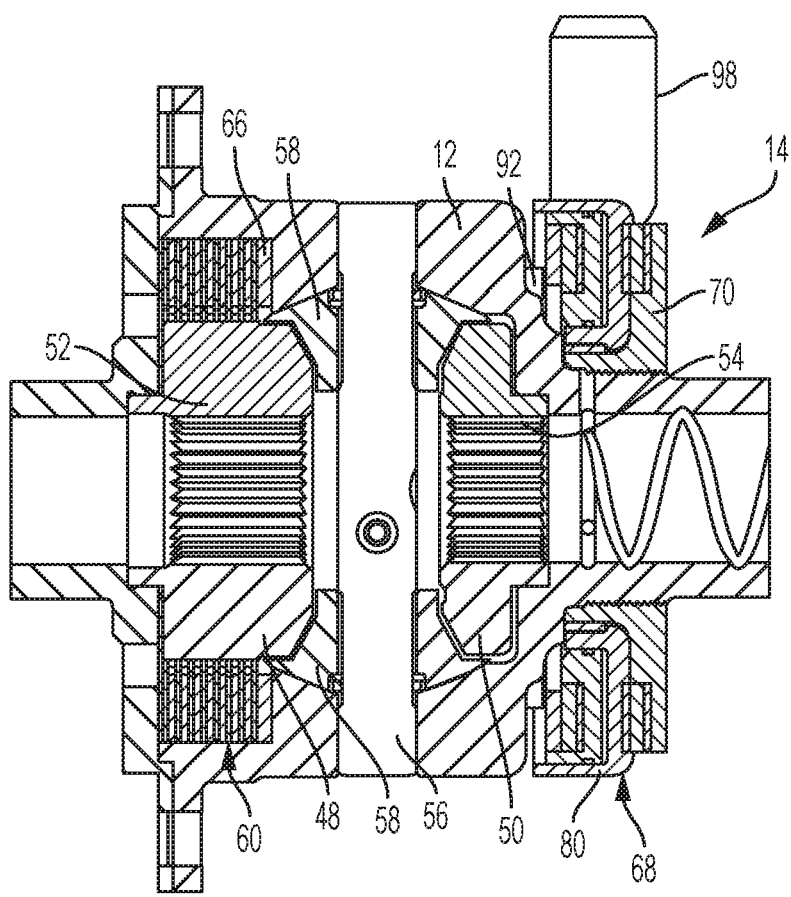
FIG. 3 is a cross-sectional view of an electronic limited slip differential assembly of the system of FIG. 1 taken along lines 3-3 and constructed in accordance to one example of the present disclosure.
Figure 4:
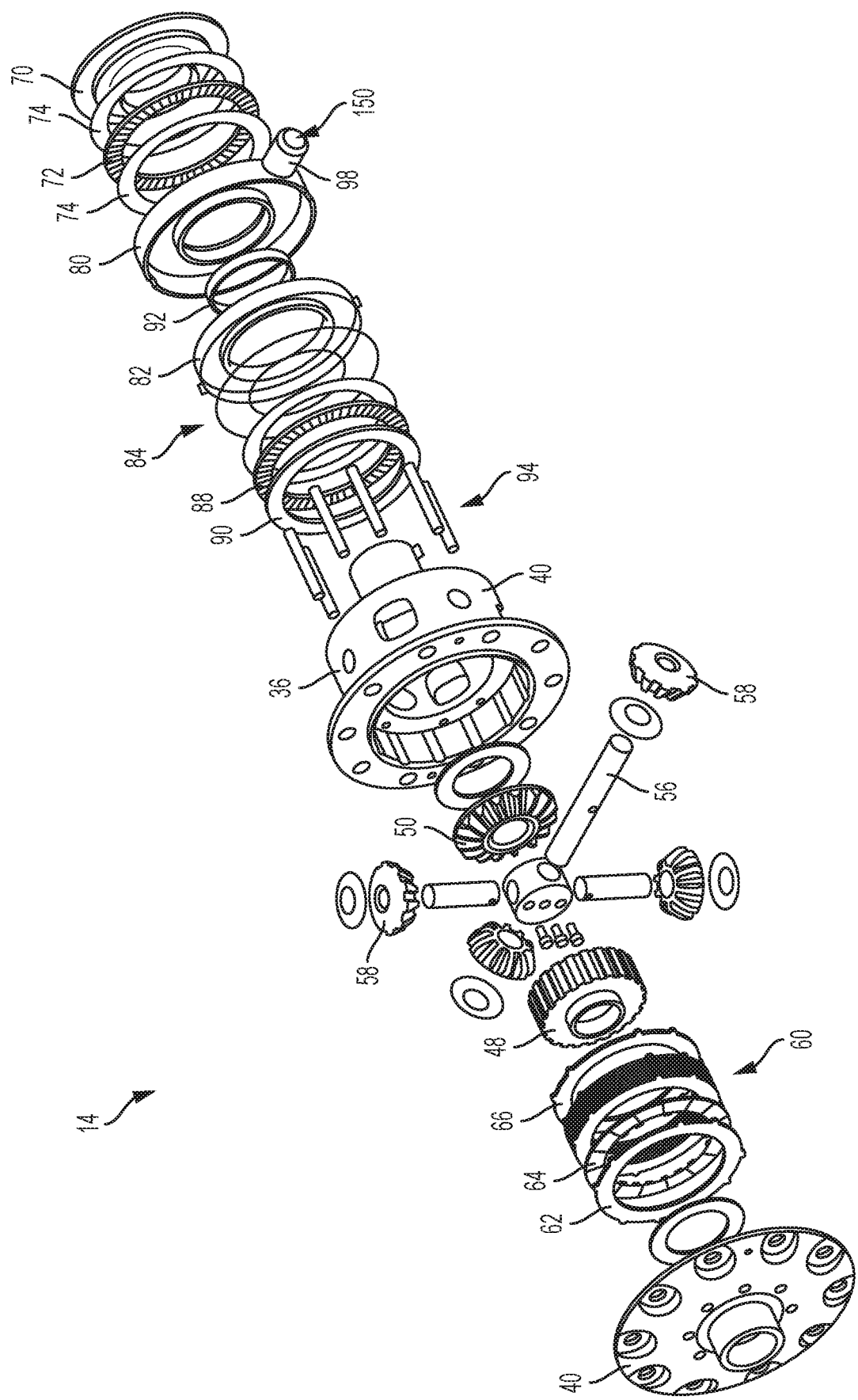
FIG. 4 is an exploded view of the electronic limited slip differential assembly shown in FIG. 1 constructed in accordance to one example of the present disclosure.

With additional reference to FIGS. 3 and 4, the electronic limited slip differential assembly 14 can generally include a carrier or differential case 40, a differential gear assembly 42, a clutch assembly 44, and a clutch actuator assembly 46. The differential gear assembly 42 and the clutch assembly 44 are disposed within case 40, and the clutch actuator assembly 46 is operably associated with the clutch assembly 44 for selective actuation thereof. The differential assembly 14 can be received within the axle housing 12 and operates to drive a pair of axle shafts that are connected to drive wheels (not shown). In general, the limited slip differential assembly 14 functions as a traditional open differential during normal operating conditions until an event occurs where a bias torque is required. When a loss in traction is detected or anticipated, the clutch assembly 44 can be selectively actuated in order to generate the optimum bias torque for the situation.

As shown in the example implementation, the differential gear assembly 42 includes a pair of side gears 48 and 50 that are mounted for rotation with the axle shafts (and first and second drive wheels). The side gears 48 and 50 define first and second axle shaft openings 52 and 54 (FIG. 3). A cross pin or pinion gear shaft 56 can be fixedly mounted to the differential case 40 for rotation therewith, and a corresponding pair of pinion gears 58 are mounted for rotation with the pinion gear shaft 56 and are in meshing relationship with both of the side gears 48 and 50. In an open configuration, the differential gear assembly 42 acts to allow the axle shafts to rotate at different speeds.

The clutch assembly 44 generally includes a clutch pack 60 operably associated with the clutch actuator assembly 46. The clutch assembly 44 couples an input of the electronic limited slip differential assembly 14 with the differential gear assembly 42. In some examples, the input can comprise a ring gear fixedly arranged around the differential case 40 that is driven by the pinion gear 30.

The clutch pack 60 includes a plurality of annular plates 62 interleaved between a plurality of annular friction disks 64. In some examples, a first transfer plate 66 can be arranged as part of the clutch pack 60. The plurality of annular plates 62 can be coupled for rotation with one of the differential case 40 and the differential gear assembly 42. The plurality of annular friction disks 64 can be coupled for rotation with the other one of the differential case 40 and the differential gear assembly 42. In the illustrated embodiment, the plurality of annular plates 62 are coupled for rotation to the differential case 40 (e.g., splined to an inner diameter of the differential case 40) and the plurality of annular friction disks 64 are coupled for rotation with the differential gear assembly 42 (e.g., splined to an outer diameter of the side gear 48). It will be appreciated that the annular friction disks 64 may be supported for rotation by either of the side gears 48 or 50, or both.

The plurality of annular plates 62 and annular friction disks 64 are interleaved between one another and act to rotate past one another in substantially non-contacting relationship when the clutch assembly 44 is in its open position. However, it will be appreciated by those skilled in the art that the term "non-contacting" as used herein is relative and is not meant to necessarily indicate that the annular plates 62 and annular friction disks 64 have absolutely no contact when the clutch assembly 44 is in the open condition. The annular plates 62 and annular friction disks 64 are axially movable into frictional engagement relative to one another, thereby reducing relative rotation between the annular plates 62 and annular friction disks 64 when the clutch assembly 44 is in the closed or partially closed configurations. In this manner, when the clutch assembly 44 is in its closed position, the side gears 48 and 50, as well as the axle shafts and the drive wheels rotate together.

The clutch assembly 44 can operate in an open configuration to allow the side gears 48 and 50 to rotate independently from each other, e.g., at different speeds. The clutch assembly 44 can also operate in a closed or partially closed configuration where the side gears 48 and 50 rotate together or partially together (that is, not independently), e.g., at substantially the same speed. The clutch assembly 44 can, for example, be a hydraulic clutch assembly 44 that utilizes pressurized hydraulic fluid that can act on the actuator assembly 46 to selectively actuate the clutch pack 60 between the open, closed and partially closed configurations.

With particular reference now to FIGS. 3 and 4, the actuator assembly 46 will by further described. The actuator assembly 46 is arranged on an opposite end of the differential case 40 as the clutch pack 60. In one example, the clutch pack 60 can be generally concentric with the first side gear 48 and the actuator assembly can be generally concentric with the second side gear 50. As a result of positioning the actuator assembly 46 on an opposite end of the differential case 40 as the clutch pack 60, a number of advantages are realized. For example, the resulting package size of the electronic limited slip differential assembly 14 is reduced, the cross-shaft 56 can be centered between bearing races, and stock axle shafts having standard lengths can be used. Moreover, the clutch pack 60 can be constructed larger to provide greater torque capacity, and the electronic limited slip differential assembly 14 can be replaced with an "open" differential on the same assembly line.

As illustrated, the actuator assembly 46 can generally include a piston assembly 68 having a retainer 70, a first needle roller 72, bearing races 74, a piston housing 80, a piston 82, a pair of o-rings 84, a second needle roller 88 and a second transfer plate 90. The second transfer plate 90 can act as a bearing race for the second needle roller 88. The piston housing 80 can be mounted in a ring 92 that seats on the retainer 70.

A plurality of transfer rods 94 are disposed between the second transfer plate 90 of the actuator assembly 46 and the first transfer plate 66 of the clutch pack 60. In the example shown, eight transfer rods 94 are disposed between the second transfer plate 90 and the first transfer plate 66. The transfer rods 94 can be spaced equally around the differential casing 40, however other quantities of transfer rods are contemplated. Furthermore, other structures may be used to transfer force between the first and second transfer plates 66 and 90.

With continued reference to FIGS. 3 and 4, additional features of the piston assembly 68 will be described. During operation, movement of the piston 82 leftward (as viewed in FIGS. 1-4) causes the transfer rods 94 to push the first transfer plate 66 leftward causing the clutch pack 60 to close. Similarly, when pressure is released from the piston 82, the transfer rods 94 move in an axial direction rightward (as viewed in FIGS. 1-4) causing the clutch pack 60 to open. Hydraulic fluid can be communicated from the HCU 16 to the actuator assembly 46 through a hydraulic port 98.

Figure 5:
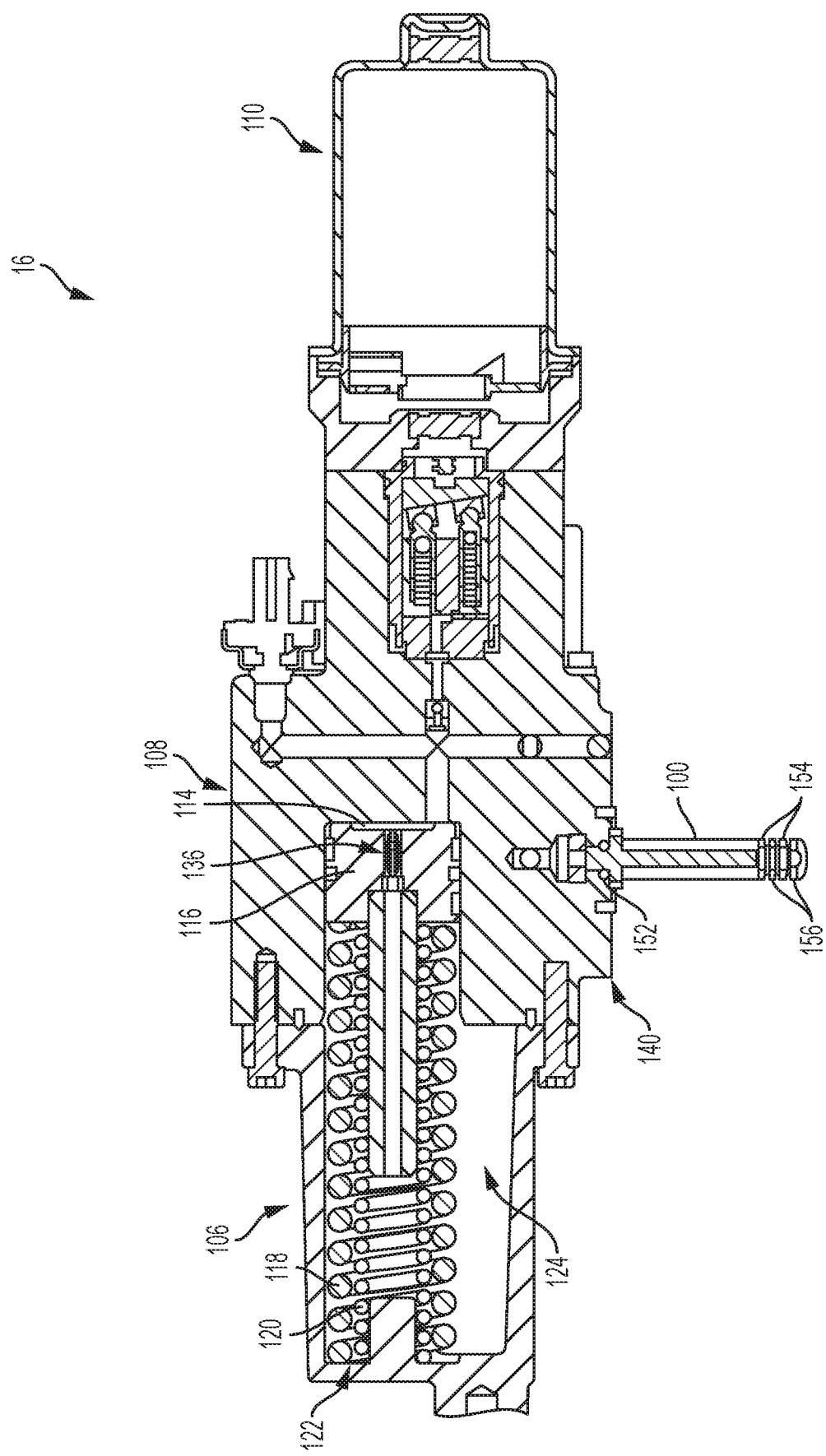
FIG. 5 is a cross-sectional view of a hydraulic control unit of the assembly of FIG. 1 taken along lines 5-5 and constructed in accordance to one example of the present disclosure.

With reference now to FIGS. 1, 2, and 5, the hydraulic control unit (HCU) 16 will be described in more detail. As discussed herein, the HCU 16 provides a single unit that can be mounted directly at one location to the axle housing 12 and the electronic limited slip differential assembly 14. Such a configuration allows for simple assembly and setup, as well as superior response times for pressure changes in in the piston assembly 68 due to the close proximity (i.e., direct connection) of the HCU 16 to the differential assembly 14. As such, system 10 does not require connecting lines or plumbing between the HCU 16 and the differential assembly 14. In some examples, the compact arrangement provides for a clearance between a top of the HCU 16 and a bottom of a floor of the vehicle. For example, the clearance may be between approximately 22 mm and approximately 30 mm, or between 22 mm and 30 mm. In other examples, the clearance is approximately 26 mm or 26 mm.

In general, as discussed herein in more detail, the HCU 16 can deliver hydraulic fluid to the differential assembly 14 through a direct-connect hydraulic coupling or nozzle 100 which extends outwardly from an outer surface of the HCU 16. The clutch assembly 44 is a hydraulic clutch that utilizes pressurized hydraulic fluid provided through the nozzle 100 from the HCU 16 to act on the piston 82 to selectively actuate the clutch pack 60 between the open, closed and partially closed configurations.

In the example implementation, the HCU 16 can generally include an outer housing 102 defined by an accumulator housing portion 106, a housing manifold portion 108, and a motor portion 110.

The accumulator housing portion 106 can define an accumulator chamber 114 that houses a piston 116, a first biasing mechanism or member 118, and a second biasing mechanism or member 120 (e.g., a spring). The first and second biasing members 118, 120 can be collectively referred to herein as a biasing assembly 122. The first biasing member 118 has a first spring rate while the second biasing member 120 has a second spring rate. The first and second spring rates cooperate together to provide a desired spring rate for the biasing assembly 122. Fluid is pumped behind the piston 116 into the accumulator chamber 114 to cause the piston 116 to translate toward the first and second biasing members 118, 120.

In the example implementation, the accumulator chamber 114 houses the biasing members 118, 120 and also provides a hydraulic sump 124 (FIG. 5). Such a configuration allows for reduced packaging space. The housing manifold portion 108 can define various fluid passages configured to provide access to various sensors disclosed herein.

The HCU 16 can further include a clutch piston pressure sensor 130 (FIG. 5), an accumulator pressure sensor 132 and a three-way proportional regulating valve 134. The clutch piston pressure sensor 130 can be threadably or otherwise securely received by the hydraulic control unit housing 102. The clutch piston pressure sensor 130 can be configured to measure a pressure at the piston of the limited slip differential 14. The accumulator pressure sensor 132 can be threadably or otherwise securely received by the hydraulic control unit housing 102. The accumulator pressure sensor 132 can be configured to measure a pressure in the accumulator chamber 114. The three-way proportional regulating valve 134 can be securely coupled to the hydraulic control unit housing 102. The three-way proportional regulating valve 134 can be threadably or otherwise securely received by the HCU housing 102, and can be configured to regulate fluid pressure within the HCU housing 102.

The motor 110 can operate a piston pump or gerotor gear assembly and can be conventionally constructed. The gerotor gear assembly can comprise an inner gerotor gear and an outer gerotor gear. The operation of the gerotor gear assembly can be conventional where relative rotation of the inner and outer gerotor gears can cause a pumping action on the fluid contained in the hydraulic control unit housing 102. In examples where a piston pump is used, the piston pump can cause a pumping action on the fluid contained in the hydraulic control unit housing 102. The pumping action ultimately causes the fluid to be pumped into the accumulator chamber 114 (that shares a common space with the sump 124). The pumping action ultimately causes the fluid to be pumped into the accumulator chamber 114. In doing so, the biasing members 118, 120 at least partially collapse and introduces a pre-charge into the system. In this regard, the motor 110 is not required to run constantly. The fluid pressure can be introduced into the limited slip differential assembly 14 by the biasing members 118, 120 acting on the piston 116. A pressure relief valve 136 can be provided in the piston 116. The pressure relief valve 136 can protect the system by releasing fluid in the event of an over pressure malfunction.

With continued reference now to FIGS. 1, 2, and 5, additional features of the hydraulic control unit housing 102 will be described. The hydraulic control unit housing 102 can define a receiving bore 138 (FIG. 5) that is configured to receive the hydraulic nozzle 100, and housing 102 can include a hydraulic control unit housing mounting structure 140. The hydraulic control unit housing mounting structure 140 can generally include four receiving bores 142 configured to receive fasteners 144. In the illustrated example, the receiving bores 142 extend from the top to the bottom of the housing manifold portion 108.

With particular reference to FIG. 1, the axle housing mounting pad 32 defines four mounting bores 146 and a hydraulic coupling receiving bore 148. The mounting bores 146 are configured to receive the fasteners 144 extending through the receiving bores 142. In general, the hydraulic coupling receiving bore 148 is configured to accept the hydraulic nozzle 100. In the example shown, the hydraulic coupling receiving bore 148 defines a diameter that is larger than a diameter of the hydraulic nozzle 100 to allow the hydraulic nozzle 100 to suitably locate into a receiving port 150 defined by the hydraulic port 98. In this regard, the HCU 16 will self-locate into the hydraulic coupling receiving bore 148 and the receiving port 150. The fasteners 144 can threadably mate with the mounting bores 146 to secure the HCU 16 to the axle housing 12 and the differential assembly 14. Accordingly, the HCU 16 can be mounted to the axle housing 12 at a single location (i.e., the single mounting pad 32) such that the HCU 16 is mounted on top of the differential case 40, which provides a reduced packaging environment and simplified installation.

The dimension of the hydraulic coupling receiving bore 148 allows the hydraulic nozzle 100 to properly align for receipt into the receiving port 150. The hydraulic nozzle 100 is permitted to locate at a plurality of positions relative to the diameter of bore 148 during assembly of the HCU 16 to the differential case 40 to accommodate a corresponding plurality of positions of the case 40 relative to the axle housing 12. A first O-ring 152 can sealingly locate between the mounting pad 32 the housing manifold portion 168. The hydraulic nozzle 100 can include second O-rings 154 received in grooves 156 and configured to sealingly engage the receiving port 150.

Once the hydraulic nozzle 100 is suitably received by the hydraulic port 98, and acceptable alignment is attained, the fasteners 144 can be tightened to a fixed position with the mounting bores 142 of the axle housing 12. Moreover, the hydraulic nozzle 100 can provide anti-rotation properties that inhibit rotation of the hydraulic nozzle 100 around its axis in the installed position. In one configuration, the HCU 16 may be pre-filled with hydraulic fluid prior to coupling to the axle housing 12. A seal (not specifically shown) may be implemented at an interface between the hydraulic nozzle 100 and the hydraulic coupling receiving bore 148 and/or the receiving port 150. Such seal may be punctured during the act of locating the hydraulic nozzle 100 into the hydraulic coupling receiving bore 148 and/or the receiving port 150.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic limited slip differential system comprising: an axle housing defining an inner chamber;
    a differential assembly disposed within the inner chamber; and a hydraulic control unit (HCU) coupled directly to a top of the axle housing such that the HCU is mounted on a top of the differential assembly,
    wherein the top of the axle housing defines a mounting pad configured to receive a housing mounting structure of the HCU,
    wherein the HCU includes a housing having an accumulator portion, a housing manifold portion, and a motor portion;
    wherein the housing manifold portion includes a plurality of receiving bores configured to align with a plurality of mounting bores defined in the mounting pad, and a plurality of fasteners extend through the aligned receiving bores and mounting bores to couple the housing manifold portion to the mounting pad.

2. The system of claim 1, wherein the mounting pad is an uppermost surface of the axle housing.

3. The system of claim 1, wherein the receiving bores extend from a top of the housing manifold portion to a bottom of the housing manifold portion.

4. The system of claim 1, wherein the HCU is only coupled to the axle housing at the location between the mounting pad and the housing manifold portion.

5. The system of claim 4, wherein the plurality of receiving bores comprises only four receiving bores, and the plurality of mounting bores comprises only four mounting bores.

6. The system of claim 1, wherein the HCU includes a hydraulic nozzle extending downwardly from the housing manifold portion, and the mounting pad includes a hydraulic receiving bore located inward of the plurality of mounting bores and configured to receive the hydraulic nozzle therethrough.

7. The system of claim 6, wherein the differential assembly comprises:
   a differential case defining first and second output shaft openings that are co-axially aligned along an axis of rotation of the differential case;
   a first and a second side gear rotatably mounted within the differential case, the first and second side gears being co-axially aligned along the axis of rotation of the differential case, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
   a pair of pinion gears mounted between the first and second side gears, both of the pinion gears being rotatably mounted on a cross shaft that is fixed for rotation with the differential case;
   a clutch pack including a plurality of annular plates interleaved between a plurality of annular friction disks, the clutch pack arranged on a first side of the cross shaft; and
   an actuator assembly comprising a piston received in a piston housing, the actuator assembly configured to actuate the clutch pack, the actuator assembly arranged on a second side of the cross shaft, opposite the first side, the actuator assembly including a hydraulic port configured to receive the hydraulic nozzle.

8. The system of claim 7, further comprising a pinion at least partially disposed within the differential case such that a clearance is defined between an end face of the pinion and an outer surface of the differential case.

9. The system of claim 8, wherein a second clearance is defined between a top of the HCU and a bottom of a vehicle floor.

10. The system of claim 9, wherein the second clearance is between approximately 22 mm and approximately 30 mm.

11. The system of claim 7, further comprising a plurality of transfer rods that couple the clutch pack and the actuator assembly.

12. The system of claim 7, wherein the actuator assembly further comprises a retainer and a first needle roller disposed on one side of the piston housing and a second needle roller disposed on an opposite side of the piston housing, and wherein the piston further comprises at least one O-ring mounted thereon, the at least one O-ring configured to slidably traverse along the piston housing.

13. The system of claim 7, wherein the hydraulic port extends from an outer circumference of the actuator assembly.

14. A vehicle comprising:
   a frame having a front and a rear;
   a vehicle floor; and
   an electronic limited slip differential system comprising:
   an axle housing defining an inner chamber;
   a differential assembly disposed within the inner chamber; and
   a hydraulic control unit (HCU) coupled directly to a top of the axle housing such that the HCU is mounted on a top of the differential assembly,
   wherein the top of the axle housing defines a mounting pad configured to receive a housing mounting structure of the HCU,
   wherein the HCU includes a housing having an accumulator portion, a housing manifold portion, and a motor portion;
   wherein the housing manifold portion includes a plurality of receiving bores configured to align with a plurality of mounting bores defined in the mounting pad, and a plurality of fasteners extend through the aligned receiving bores and mounting bores to couple the housing manifold portion to the mounting pad.

15. The vehicle of claim 14, wherein a clearance is defined between a top of the HCU and a bottom of a floor pan of the vehicle floor.

16. The vehicle of claim 15, wherein the clearance is between approximately 22 mm and approximately 30 mm.

* * * * *